United States Patent
Kloppenburg et al.

(10) Patent No.: US 9,934,197 B2
(45) Date of Patent: Apr. 3, 2018

(54) METHOD AND DEVICE FOR PROVIDING A SPARSE GAUSSIAN PROCESS MODEL FOR CALCULATION IN AN ENGINE CONTROL UNIT

(71) Applicant: Robert Bosch GmbH, Stuttgart (DE)

(72) Inventors: Ernst Kloppenburg, Ditzingen (DE); Michael Hanselmann, Korntal (DE); Heiner Markert, Stuttgart (DE); Felix Streichert, Yokohama (JP)

(73) Assignee: ROBERT BOSCH GMBH, Stuttgart (DE)

( * ) Notice: Subject to any disclaimer, the term of this patent is extended or adjusted under 35 U.S.C. 154(b) by 585 days.

(21) Appl. No.: 14/581,352

(22) Filed: Dec. 23, 2014

(65) Prior Publication Data

US 2015/0186332 A1 Jul. 2, 2015

(30) Foreign Application Priority Data

Dec. 27, 2013 (DE) .................. 10 2013 227 183

(51) Int. Cl.
*G06F 17/10* (2006.01)
*G06F 17/17* (2006.01)
*G06F 17/16* (2006.01)

(52) U.S. Cl.
CPC ............ *G06F 17/10* (2013.01); *G06F 17/175* (2013.01); *G05B 2219/40336* (2013.01); *G06F 17/16* (2013.01)

(58) Field of Classification Search
None
See application file for complete search history.

(56) References Cited

U.S. PATENT DOCUMENTS 5,442,569 A * 8/1995 Osano ................. G06F 17/5018
716/107
8,825,730 B1* 9/2014 Perry ...................... G06F 17/16
708/520

(Continued)

FOREIGN PATENT DOCUMENTS

DE    10 2010 028259    10/2011

OTHER PUBLICATIONS

E. V. Bonilla, K. M. A. Chai, C. K. I. Williams "Multi-task Gaussian Process Prediction" pp. 1-8, 2008.*

(Continued)

*Primary Examiner* — Kibrom K Gebresilassie
(74) *Attorney, Agent, or Firm* — Norton Rose Fulbright US LLP; Gerard Messina

(57) ABSTRACT

A method for determining a sparse Gaussian process model to be carried out in a solely hardware-based model calculation unit includes: providing supporting point data points, a parameter vector based thereon, and corresponding hyperparameters; determining or providing virtual supporting point data points for the sparse Gaussian process model; and determining a parameter vector $Q_v^*$ for the sparse Gaussian process model with the aid of a Cholesky decomposition of a covariant matrix $K_M$ between the virtual supporting point data points and as a function of the supporting point data points, the parameter vector based thereon, and the corresponding hyperparameters, which define the sparse Gaussian process model.

6 Claims, 1 Drawing Sheet

(56) References Cited

U.S. PATENT DOCUMENTS

| | | | | |
|---|---|---|---|---|
| 2009/0150126 | A1* | 6/2009 | Sellamanickam | G06N 7/005 703/2 |
| 2010/0161534 | A1* | 6/2010 | Sellamanickam | G06N 99/005 706/46 |
| 2011/0280295 | A1* | 11/2011 | Corona | H04L 25/03006 375/224 |
| 2012/0084042 | A1* | 4/2012 | Yuan | G06N 7/005 702/116 |
| 2014/0310211 | A1* | 10/2014 | Markert | G06N 99/005 706/12 |
| 2017/0300911 | A1* | 10/2017 | Alnajem | G06Q 20/4016 |

OTHER PUBLICATIONS

Seeger, M., Williams, C.K., Lawrence, N. D., "Fast-Forward Selection to Speed up Sparse Gaussian Process Regression", Proceedings of the 9th International Workshop on Artificial Intelligence and Statistics, 2003.

Smola, A.J., Schoelkopf, W., "Sparse Greedy Gaussian Process Regression", Advances in Neural Information Processing Systems 13, pp. 619-625, 2001.

Csato, Lehel; Opper, Manfred, "Sparse On-Line Gaussian Processes", Neural Computation 14: pp. 641-668, 2002.

E. Snelson et al., "Sparse Gaussian Processes using Pseudo-inputs", 2006 Neural Information Processing Systems 18 (NIPS).

\* cited by examiner

METHOD AND DEVICE FOR PROVIDING A SPARSE GAUSSIAN PROCESS MODEL FOR CALCULATION IN AN ENGINE CONTROL UNIT

RELATED APPLICATION INFORMATION

The present application claims priority to and the benefit of German patent application no. 10 2013 227 183.2, which was filed in Germany on Dec. 27, 2013, the disclosure of which is incorporated herein by reference.

FIELD OF THE INVENTION

The present invention relates in general to engine control units, in which function models are implemented as data-based function models. In particular, the present invention relates to methods for determining a sparse Gaussian process model from provided supporting point data.

BACKGROUND INFORMATION

The use of data-based function models is provided for the implementation of function models in control units, in particular engine control units for internal combustion engines. Parameter-free data-based function models are frequently used, since they may be prepared without specific specifications from training data, i.e., a set of training data points.

One example of a data-based function model is represented by the so-called Gaussian process model, which is based on the Gaussian process regression. The Gaussian process regression is a multifaceted method for database modeling of complex physical systems. Regression analysis is typically based on large quantities of training data, so that it is advantageous to use approximate approaches, which may be analyzed more efficiently.

For the Gaussian process model, the possibility exists of a sparse Gaussian process regression, during which only a representative set of supporting point data is used to prepare the data-based function model. For this purpose, the supporting point data must be selected or derived in a suitable way from the training data.

The publications by E. Snelson et al., "Sparse Gaussian Processes using Pseudo-inputs", 2006 Neural Information Processing Systems 18 (NIPS) and Csató, Lehel; Opper, Manfred, "Sparse On-Line Gaussian Processes"; Neural Computation 14: pages 641-668, 2002, discuss a method for ascertaining supporting point data for a sparse Gaussian process model.

Other methods in this regard are discussed in Smola, A. J., Schölkopf, W., "Sparse Greedy Gaussian Process Regression", Advances in Neural Information Processing Systems 13, pages 619-625, 2001, and Seeger, M., Williams, C. K., Lawrence, N. D., "Fast-Forward Selection to Speed up Sparse Gaussian Process Regression", Proceedings of the 9th International Workshop on Artificial Intelligence and Statistics, 2003.

Furthermore, control modules having a main computing unit and a model calculation unit for calculating data-based function models in a control unit are known from the related art. Thus, for example, the publication DE 10 2010 028 259 A1 describes a control unit having an additional logic circuit as a model calculation unit which is configured for calculating exponential functions to assist in carrying out Bayesian regression methods, which are required in particular for calculating Gaussian process models.

The model calculation unit is configured as a whole for carrying out mathematical processes for calculating the data-based function model based on parameters and supporting points or training data. In particular, the functions of the model calculation unit are implemented solely in hardware for efficient calculation of exponential and summation functions, so that it is made possible to calculate Gaussian process models at a higher computing speed than may be carried out in the software-controlled main computing unit.

SUMMARY OF THE INVENTION

According to the present invention, a method for determining a sparse Gaussian process model according to the description herein, as well as a model calculation unit, a control unit, and a computer program according to the further descriptions herein are provided.

Other advantageous embodiments are specified in the further description herein.

According to a first aspect, a method is provided for determining a sparse Gaussian process model to be carried out in a solely hardware-based model calculation unit, including the following steps:
  providing supporting point data points, a parameter vector based thereon, and corresponding hyperparameters;
  determining or providing virtual supporting point data points for the sparse Gaussian process model; and
  determining a parameter vector for $Q_y^*$ the sparse Gaussian process model with the aid of a Cholesky decomposition of a covariant matrix $K_M$ between the virtual supporting point data points and as a function of the supporting point data points, the parameter vector based thereon, and the corresponding hyperparameters, which define the sparse Gaussian process model.

The above-described method provides a possibility of preparing a sparse Gaussian process model based on a number of predefined virtual supporting point data points in a simple way.

Sparse Gaussian process models are substantially more memory-efficient than conventional Gaussian process models, since only M<<N supporting point data points must be stored. One-fourth of the supporting point data points or less are frequently sufficient. Therefore, more data-based function models may be stored in a physical model calculation unit. In addition, the analysis of the individual, smaller Gaussian process models may be carried out more rapidly.

Furthermore, the method may include the further following steps:
  ascertaining a covariant matrix $K_N$ between the conventional supporting point data points, a covariant matrix $K_M$ between the virtual supporting point data points, and a covariant matrix $K_{MN}$ between the conventional and the virtual supporting point data points;
  determining a diagonal matrix $\Lambda$ from $K_{MN}{}^T K_M{}^{-1} K_{MN}$, in particular using the Cholesky decomposition of the covariant matrix $K_M$ between the virtual supporting point data points; and
  determining a parameter vector $Q_y^*$, based on the hyperparameters for the sparse Gaussian process model based on the diagonal matrix.

The method may include the further following steps:
  determining an intermediate variable $Q_M = K_M + K_{MN}(\Lambda + \sigma_n^2 I)^{-1} K_{MN}{}^T$ from the diagonal matrix $\Lambda$ while using a Cholesky decomposition of the covariant matrix $K_{MN}$ between the conventional and the virtual supporting point data points; and determining a parameter vector $Q_y^*$ based on the hyperparameters for the sparse Gaussian process model based on the intermediate variable $Q_M$.

It may be provided that parameter vector $Q_y^*$ for the sparse Gaussian process model is ascertained as $Q_y^* = L_m^{-T} L_m^{-1} + K_{MN}(\Lambda + \sigma_n^2 I)^{-1} Y$, $L_M$ corresponding to the Cholesky decomposition of intermediate variable $Q_M$.

In particular, a jitter may be applied to hyperparameter vector $Q_y^*$ for the sparse Gaussian process model.

According to another aspect, a model calculation unit for carrying out a calculation of a sparse Gaussian process model is provided, the sparse Gaussian process model being calculated based on the hyperparameters ascertained according to the above method for the sparse Gaussian process model, derived parameter vector $Q_y^*$, and the virtual supporting point data points.

Specific embodiments will be explained in greater detail hereafter on the basis of the appended drawings.

DETAILED DESCRIPTION

Figure 1:
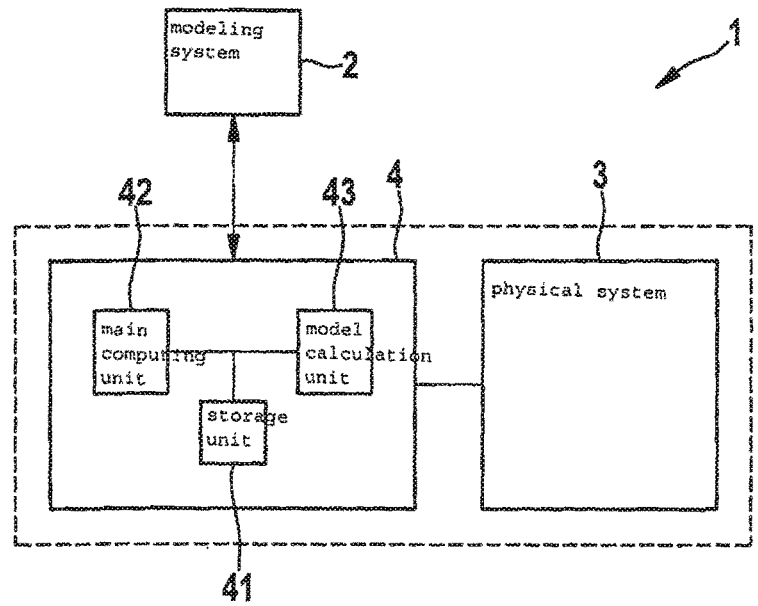
FIG. 1 shows a schematic view of an overall system for ascertaining a sparse Gaussian process model and the engine control unit on which the sparse Gaussian process model is implemented.

FIG. 1 shows an arrangement 1 having a modeling system 2, which is capable of ascertaining a data-based function model, in particular a Gaussian process model, based on training data recorded, for example, in a test stand (not shown). The training data provide training data points of one or multiple input variable(s) and one or multiple output variable(s), which describe a behavior of a physical system 3, for example, an internal combustion engine.

The use of nonparametric, data-based function models is based on a Bayesian regression method. The fundamentals of Bayesian regression are described, for example, in C. E. Rasmussen et al., "Gaussian Processes for Machine Learning," MIT Press 2006. Bayesian regression is a data-based method which is based on a model. To prepare the model, measuring points of training data and associated output data of an output variable to be modeled are required. The preparation of the model is carried out based on the use of supporting point data, which entirely or partially correspond to the training data or are generated therefrom. Furthermore, abstract hyperparameters are determined, which parameterize the space of the model functions and effectively weight the influence of the individual measuring points of the training data on the later model prediction.

The abstract hyperparameters are determined by an optimization method. One possibility for such an optimization method is an optimization of a marginal likelihood $p(Y|H, X)$. Marginal likelihood $p(Y|H, X)$ describes the plausibility of model parameters H, given the measured y values of the training data, represented as vector Y and the x values of the training data, represented as matrix X. In model training, $p(Y|H, X)$ is maximized by searching for suitable hyperparameters which result in a curve of the model function determined by the hyperparameters and the training data and which image the training data as precisely as possible. To simplify the calculation, the logarithm of $p(Y|H, X)$ is maximized, since the logarithm does not change the consistency of the plausibility function.

The calculation of the Gaussian process model takes place according to the calculation specification below. Input values $\tilde{x}_d$ for a test point x (input variable vector) are first scaled and centered, specifically according to the following formula:

$$x_d = \frac{\widetilde{x_d} - (m_x)d}{(s_x)d}.$$

In this formula, $m_x$ corresponds to the mean value function with respect to a mean value of the input values of the supporting point data, $s_x$ corresponds to the variance of the input values of the supporting point data, and d corresponds to the index for dimension D of test point x.

The following equation is obtained as the result of the preparation of the nonparametric, data-based function model:

$$v = \sum_{i=1}^{N} (Q_y)_i \sigma_f \exp\left(-\frac{1}{2} \sum_{d=1}^{D} \frac{(X_{i,d} - x_d)^2}{l_d}\right).$$

Model value v thus ascertained is scaled with the aid of an output scaling, specifically according to the following formula:

$$\tilde{v} = v s_y + m_y.$$

In this formula, v corresponds to a scaled model value (output value) at a scaled test point x (input variable vector of dimension D), $\tilde{v}$ corresponds to a (non-scaled) model value (output value) at a (non-scaled) test point $\tilde{u}$ (input variable vector of dimension D), $x_i$ corresponds to a supporting point of the supporting point data, N corresponds to the number of the supporting points of the supporting point data, D corresponds to the dimension of the input data/training data/supporting point data space, and $l_d$ and $\sigma_f$ correspond to the hyperparameters from the model training, namely the length scale and the amplitude factor. Vector $Q_y$ is a variable calculated from the hyperparameters and the training data. Furthermore, $m_y$ corresponds to the mean value function with respect to a mean value of the output values of the supporting point data and $s_y$ corresponds to the variance of the output values of the supporting point data.

Modeling system 2 furthermore carries out a method for processing the ascertained or provided training data, to provide the data-based function model with the aid of hyperparameters and supporting point data, which represent a subset of the training data. In this way, a so-called sparse Gaussian process model is prepared.

These supporting point data and hyperparameters are transferred into a control unit 4 and stored therein. Control unit 4 is connected to a physical system 3, for example, an internal combustion engine, which is operated with the aid of the data-based function model.

FIG. 1 furthermore shows a schematic view of a hardware architecture for an integrated control module, for example, in the form of a microcontroller, in which a main computing unit 42 and a model calculation unit 43 are provided in an integrated way for the solely hardware-based calculation of a data-based function model. The hyperparameters and supporting point data are stored in a storage unit 41. Main computing unit 42, storage unit 41, and model calculation unit 43 have a communication link to one another via an internal communication link 44, for example, a system bus.

Main computing unit 42, which is provided as a microcontroller, is configured to calculate function values of the provided data-based function model with the aid of a software-determined algorithm. To accelerate the calculation and to relieve microcontroller 42, it is provided that model calculation unit 43 is used. Model calculation unit 43 is completely implemented in hardware and is capable only of carrying out a certain calculation specification, which is essentially based on repeated calculations of an addition function, a multiplication function, and an exponential function. Fundamentally, model calculation unit 43 is thus essentially hardwired and is accordingly not configured to execute a software code, as in the case of main computing unit 42.

Alternatively, an approach is possible in which model calculation unit 43 provides a restricted, highly specialized command set for calculating the data-based function model. However, a processor is not provided in model calculation unit 43 in any specific embodiment. This enables resource-optimized implementation of such a model calculation unit 43 or an area-optimized setting in an integrated construction.

In such a control unit 4, in addition to conventional Gaussian process models, sparse Gaussian process models may also be calculated. Since, in the case of sparse Gaussian process models, the quantity of supporting point data is significantly less than in conventional Gaussian process models, the storage capacity to be provided of storage unit 41 for storing the supporting point data may be reduced or multiple data sets of training data of multiple sparse Gaussian process models may be stored in storage unit 41.

A conventional Gaussian process regression uses the given supporting point data points/training data points for calculating the covariant matrix. The model prediction is obtained in the form $$y = k_x^T \cdot Q_y = \sum_{i=1}^{N} \sigma_f \cdot (Q_y)_i \cdot e^{-\frac{1}{2}\sum_{d=1}^{D} \frac{(x_d - x_{i,d})^2}{l_d}},$$

where $k_x^T, Q_y \in R^N$ applies. It is to be emphasized that $k_x^T$ represents the covariant vector between query point x and the supporting point data points. This is calculated by the "squared exponential" core as $$(k_x)_i = K(x, x_i) = \sigma_f \exp\left(-\frac{1}{2}\sum_{d=1}^{D} \frac{(x_d - x_{i,d})^2}{l_d}\right).$$

In the case of sparse Gaussian process models, the essential idea is to replace the given supporting point data, which are formed by the "real" supporting point data points, with "virtual", i.e., artificially generated supporting point data points. M artificial points are generated and suitably positioned by an optimizer in such a way that the model prediction of a sparse Gaussian process model using the virtual supporting point data points corresponds as exactly as possible to that of the Gaussian process model using the original supporting point data points. By integrating out the artificial y data, it is only necessary to optimize M virtual X positions $\bar{x}_i$.

The model prediction for the sparse Gaussian process model results as $$y = k_*^T Q_M^{-1} K_{MN} (\Lambda - \sigma_n^2 I)^{-1} Y,$$

where $k_*^T \in R^M$, $Q_M \in R^{M \times M}$, $K_{MN} \in R^{M \times N}$, $\Lambda$ is an N-dimensional diagonal matrix, and Y is the vector of the y values of the original supporting point data points.

In the formula, $k_*^T$ is again the covariant vector, but calculated this time between query point x and the M-dimensional vector of virtual supporting point data points $\bar{x}_i$. The vector multiplied therein as a scalar product is provided, however, by the expression $$Q_y^* = Q_M^{-1} K_{MN} (\Lambda - \sigma_n^2 I)^{-1} Y$$

The same form as for the prediction of conventional Gaussian processes is thus obtained:

$$y = k_*^T Q_y^* = \sum_{i=1}^{M} \sigma_f \cdot (Q_y^*)_i \cdot e^{-\frac{1}{2}\sum_{d=1}^{D} \frac{(x_d - x_{i,d})^2}{l_d}},$$

if suitable values are used for parameter vector $Q_y^*$ and the virtual supporting point data points.

Figure 2:
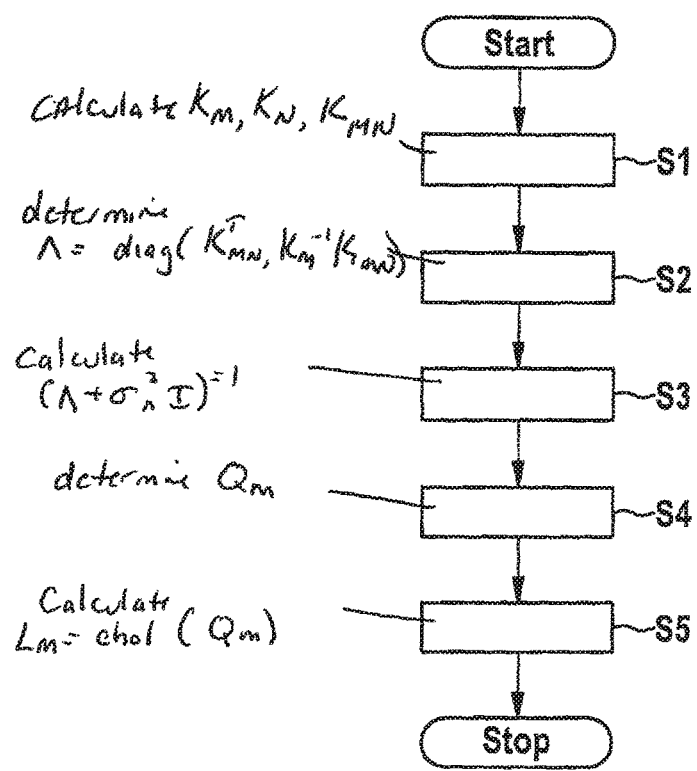
FIG. 2 shows a flow chart to illustrate a method for determining a sparse Gaussian process model.

FIG. 2 schematically shows a flow chart to illustrate a method for providing a sparse Gaussian process model using hyperparameters and supporting point data.

The essential step in the preparation of the sparse Gaussian process model in the form of the algorithm available on model calculation unit 43 is the calculation of vector $Q_y^*$. Multiple possibilities exist for this purpose; before they are described, however, some notation must firstly be introduced.

| variable | meaning |
| --- | --- |
| N | number of the supporting point data points in the original Gaussian process model |
| M | number of the virtual supporting point data points |
| $\bar{x}_i \in R^D$ | i-th virtual supporting point data point |
| Y | vector of the y values of the supporting point data points. (N elements) |
| $K(x_p, x_q)$ | covariant function (squared exponential) |
| $(K_N)_{i,j} = K(x_i, x_j)$ | covariant matrix of the supporting point data points |
| $(K_M)_{i,j} = K(\bar{x}_i, \bar{x}_j)$ | covariant matrix of the virtual supporting point data points |
| $(K_{NM})_{i,j} = K(x_i, \bar{x}_j)$ | covariant matrix between real and virtual supporting point data points (is also used transposed as $K_{MN}$) |
| $(k_i)_j = (K_{NM})_{i,j}$ | $k_i$ is the i-th line of matrix $K_{NM}$ |
| $\lambda_i = (K_N)_{i,i} - k_i^T K_M^{-1} k_i$ | intermediate value $\lambda \in R^N$ |
| $\Lambda = \text{diag}(\lambda)$ | diagonal matrix with $\lambda$ on the diagonal |
| $Q_M = K_M + K_{MN}(\Lambda - \sigma_n^2 I)^{-1} K_{NM}$ | intermediate variable |
| $(k_*)_i = K(\bar{x}_i, x^*)$ | covariant of virtual support point data point $\bar{x}_i$ with query point x* |

In addition, the Cholesky method for solving equation systems having a positive defined square matrix is also used.

For a positive defined square matrix K, a Cholesky decomposition L may always be calculated, so that L is an upper triangular matrix with the property $$L^T L = K.$$

To solve the equation system K·x=v, the expression $K^{-1}v$ must be calculated. This is carried out with the aid of the Cholesky decomposition as follows:

$$K^{-1}v=(L^TL)^{-1}v=L^{-1}L^{-T}v.$$

In the formula, $L^{-T}=(L^{-1})^T$ denotes the transposed inverse. Since L is an upper triangular matrix, the expression may be calculated by a forward substitution and a reverse substitution.

Expressions of the form $v^T K^{-1} v$ for a positive defined matrix K and a vector v may be represented with the aid of the Cholesky decomposition as follows:

$$v^T K^{-1} v = v^T (LL^T)^{-1} v = (L^{-1}v)^T(L^{-1}v) = \|L^{-1}v\|_2^2.$$

In conjunction with Gaussian processes, K is typically a covariant matrix and therefore square and positively-semi-definite. For the positive-definite case, the above equations may thus be used. If the matrix is positive-semi-definite, a jitter (for example, a value of $10^{-6}$) is thus typically added to the diagonal of matrix K, to obtain a positive-definite matrix.

Two methods for determining vector $Q_y^*$ will be explained hereafter.

1) Direct Method

The direct conversion of $Q_y^* = Q_M^{-1} + K_{MN}(\Lambda - \sigma_n^2 I)^{-1} Y$ is one possible procedure. If possible, the Cholesky decomposition is used to avoid direct calculations of inverse matrices. The calculation of $Q_y^*$ is carried out according to the following steps, which will be explained in conjunction with FIG. 2:

In step S1, matrices $K_M$, $K_N$, and $K_{MN}$ are calculated.

Subsequently, in step S2, $\Lambda = \text{diag}(K_{MN}^T K_M^{-1} K_{MN})$ is determined using the Cholesky decomposition of $K_M$ (with a jitter).

In step S3, $(\Lambda + \sigma_n^2 I)^{-1}$ is calculated, $\Lambda + \sigma_n^2 I$ corresponding to a diagonal matrix which may simply be inverted element by element.

In step S4, $Q_M$ is determined.

In step S5, the Cholesky decomposition $L_M = \text{chol}(Q_M)$ of $Q_M$ is calculated. In this case, as in step S2, a jitter is added to $Q_M$. This corresponds to the procedure as if matrix $K_M$ were provided with a jitter and then used for calculating $Q_M$.

$Q_y^* = L_m^{-T} L_m^{-1} + K_{MN}(\Lambda + \sigma_n^2 I)^{-1} Y$ then results, a forward or reverse substitution being necessary in each case. Y are the y values of the original training data, i.e., the same y values as are used for the normal training of the Gaussian process model. (The reduction of the dimension takes place with the multiplication of $K_{MN}$ from the left).

2) Matrix Factorization

A second procedure includes the use of a matrix factorization.

Firstly, new variables are introduced:

$L=\text{chol}(K_M)^T$
$V_1 = L^{-1} K_{MN}$
$V_2 = V_1 \sigma_n \sqrt{\Lambda + \sigma_n^2 I}^{-1}$
$y_2 = \sigma n \sqrt{\Lambda + \sigma_n^2 I}^{-1} Y$
$L_m = \text{chol}(\sigma_n^2 I + V_2 V_2^T)^T$
$l_{st} = L^{-1} k_*$
$l_{mst} = L_m^{-1} l_{st} = L_m^{-1} L^{-1} k_*$
$\beta = L_m^{-1}(V_2 y_2)$ Since $\Lambda$ is a diagonal matrix, $\sqrt{\Lambda + \sigma_n^2 I}$ is the Cholesky decomposition of $\Lambda + \sigma_n^2 I$.

Matrix $Q_M$ may be represented as $$Q_M = K_M + \overline{K}_{MN}(\Lambda + \sigma_n^2 I)^{-1} K_{MN}^T$$

$$= K_M + LL^{-1} K_{MN}(\Lambda + \sigma_n^2 I)^{-1}(L^{-1} K_{MN})^T L^T$$

$$= LL^T + LV_1(\Lambda + \sigma_n^2 I)^{-1} V_1^T L^T$$

$$= L(I + V_1(\Lambda + \sigma_n^2 I)^{-1} V_1^T) L^T$$

Therefore, $Q_M^{-1}$ results as $$Q_M^{-1} = L^{-T}(I + V_1(\Lambda + \sigma_n^2 I)^{-1} V_1^T)^{-1} L^{-1}. \quad \text{Formula 1}$$

Under the consideration that $\Lambda + \sigma_n^2 I$ is a diagonal matrix, it follows that $$V_2 V_2^T = V_1 \sigma_n \sqrt{\Lambda + \sigma_n^2 I}^{-1} \left( V_1 \sigma_n \sqrt{\Lambda + \sigma_n^2 I}^{-1} \right)^T$$

$$= V_1 \sigma_n \sqrt{\Lambda + \sigma_n^2 I}^{-1} \left( \sqrt{\Lambda + \sigma_n^2 I}^{-1} \sigma_n V_1^T \right)$$

$$= \sigma_n^2 V_1 (\Lambda + \sigma_n^2 I)^{-1} V_1^T \quad \text{and}$$

with formula 1, it results that $$Q_M^{-1} = \sigma_n^2 L^{-T}(\sigma_n^2 I + V_2 V_2^T)^{-1} L^{-1} = \sigma_n^2 L^{-T}(L_m L_m^T)^{-1} L^{-1}. \quad \text{Formula 2}$$

For further observation, the expression $V_2 y_2$ must still be considered. In the rearrangement, the fact is again utilized that $\Lambda + \sigma_n^2 I$ is a diagonal matrix:

$$V_2 y_2 = V_1 \sigma_n \sqrt{\Lambda + \sigma_n^2 I}^{-1} \sigma_n \sqrt{\Lambda + \sigma_n^2 I}^{-1} Y \quad \text{Formula 3}$$

$$= \sigma_n^2 V_1(\Lambda + \sigma_n^2 I)^{-1} Y$$

$$= L^{-1} \sigma_n^2 K_{MN}(\Lambda + \sigma_n^2 I)^{-1} Y$$

The model prediction then results as $$y = k_*^T Q_M^{-1} K_{MN}(\Lambda + \sigma_n^2 I)^{-1} Y$$

By inserting formula 2, the following formula results $$= k_*^T L^{-T}(L_m L_m^T)^{-1} L^{-1} \sigma_n^2 K_{MN}(\Lambda + \sigma_n^2 I)^{-1} Y$$

By inserting formula 3, the following formulas result $$= k_*^T L^{-T} L_m^{-T} L_m^{-1} V_2 y_2 \quad \text{Formula 4}$$

$$= (L^{-1} k_*)^T L_m^{-T} \beta$$

$$= (L_m^{-1} L^{-1} k_*)^T \beta$$

$$= l_{mst}^T \beta$$

$$= (\beta^T l_{mst})^T \quad \text{Formula 5}$$

In the model analysis, expression $l_{mst}$ may be determined. $\beta^T$ is calculated beforehand off-line and stored. To determine $l_{mst}$, two forward substitutions are to be calculated, which is relatively time-consuming and therefore not possible on model calculation unit 43.

The only possibility for calculating this form of the model analysis using the process provided on model calculation unit 43 is according to Formula 4. With the proviso $$Q_y^* = L^{-T} L_m^{-T} L_m^{-1} V_2 y_2.$$

the model prediction may be carried out according to the formula $$y = k_*^T Q_y^* = \sum_{i=1}^{M} \sigma_f \cdot (Q_y^*)_i \cdot e^{-\frac{1}{2} \sum_{d=1}^{D} \frac{(x_d - x_{i,d})^2}{l_d}}$$

which is implemented on model calculation unit 43.

What is claimed is:

1. A method for determining a sparse Gaussian process model, comprising:
   providing an internal combustion engine in a test stand;
   recording supporting point data points from the test stand into a storage unit, the supporting point data points describing a behavior of the internal combustion engine;
   performing, by a hardware-based model calculation unit, the following:
      providing the supporting point data points, a parameter vector based on the supporting data points, and corresponding hyperparameters;
      determining or providing virtual supporting point data points for the sparse Gaussian process model, wherein the virtual supporting point data points are artificially generated supporting point data points;
      determining a parameter vector $Q_y^*$ for the sparse Gaussian process model by performing a Cholesky decomposition of a covariant matrix $K_M$ between the virtual supporting point data points and as a function of the supporting point data points, the parameter vector based thereon, and the corresponding hyperparameters;
      ascertaining a covariant matrix $K_N$, the covariant matrix $K_M$, and a covariant matrix $K_{MN}$, wherein $K_N$ is ascertained by determining a covariance of between the supporting point data points, wherein $K_M$ is ascertained by determining a covariance between the virtual supporting point data points, and wherein $K_{MN}$ is ascertained by determining a covariance between the supporting point data points and the virtual supporting point data points;
      determining a diagonal matrix $\Lambda$ from $K_{MN}^T K_M^{-1} K_{MN}$, using the Cholesky decomposition of the covariant matrix $K_M$ between the virtual supporting point data points;
      determining the parameter vector $Q_y^*$ based on the hyperparameters for the sparse Gaussian process model based on the diagonal matrix;
      determining an intermediate variable $Q_M = K_M + K_{MN}(\Lambda + \sigma_n^2 I)^{-1} K_{MN}^T$ from the diagonal matrix $\Lambda$ while using a Cholesky decomposition of the covariant matrix $K_{MN}$ between the conventional and the virtual supporting point data points; and
      determining the parameter vector $Q_y^*$ based on the hyperparameters for the sparse Gaussian process model based on the intermediate variable $Q_M$, wherein the sparse Gaussian process model is determined based on the parameter vector $Q_y^*$;
   storing the virtual supporting point data points and the hyperparameters for the sparse Gaussian process model on a control unit of a further internal combustion engine; and
   operating the further internal combustion engine, by the control unit, using the sparse Gaussian process model, the virtual supporting point data points, and the hyperparameters for the sparse Gaussian process model.

2. The method of claim 1, wherein the vector $Q_y^*$ for the sparse Gaussian process model is ascertained as $Q_y^* = L_m^{-T} L_m^{-1} + K_{MN}(\Lambda + \sigma_n^2 I)^{-1} Y$, $L_M$ corresponding to the Cholesky decomposition of intermediate variable $Q_M$.

3. The method of claim 1, wherein a jitter is applied to the hyperparameter vector $Q_M$ for the sparse Gaussian process model.

4. A non-transitory computer readable medium having a computer program, which is executable by a processor, comprising:
   a program code arrangement having program code for determining a sparse Gaussian process model, which is performed in a hardware-based model calculation unit, by performing the following:
      reading supporting point data points from a storage unit, the supporting point data points describing a behavior of an internal combustion engine in a test stand, the test stand providing the supporting point data points to the storage unit;
      providing the supporting point data points, a parameter vector based on the supporting point data points, and corresponding hyperparameters;
      determining or providing virtual supporting point data points for the sparse Gaussian process model, wherein the virtual supporting point data points are artificially generated supporting data points;
      determining a parameter vector $Q_y^*$ for the sparse Gaussian process model by performing a Cholesky decomposition of a covariant matrix $K_M$ between the virtual supporting point data points and as a function of the supporting point data points, the parameter vector based on the supporting point data points, and the corresponding hyperparameters;
      ascertaining a covariant matrix $K_N$, the covariant matrix $K_M$, and a covariant matrix $K_{MN}$, wherein $K_N$ is ascertained by determining a covariance of between the supporting point data points, wherein $K_M$ is ascertained by determining a covariance between the virtual supporting point data points, and wherein $K_{MN}$ is ascertained by determining a covariance between the supporting point data points and the virtual supporting point data points;
      determining a diagonal matrix $\Lambda$ from $K_{MN}^T K_M^{-1} K_{MN}$, using the Cholesky decomposition of the covariant matrix $K_M$ between the virtual supporting point data points; and
      determining the parameter vector $Q_y^*$ based on the hyperparameters for the sparse Gaussian process model based on the diagonal matrix;
      determining an intermediate variable $Q_M = K_M + K_{MN}(\Lambda + \sigma_n^2 I)^{-1} K_{MN}^T$ from the diagonal matrix $\Lambda$ while using a Cholesky decomposition of the covariant matrix $K_{MN}$ between the conventional and the virtual supporting point data points; and
      determining the parameter vector $Q_y^*$ based on the hyperparameters for the sparse Gaussian process model based on the intermediate variable $Q_M$ $Q_M$, wherein the sparse Gaussian process model is determined based on the parameter vector $Q_y^*$;

storing the virtual supporting point data points and the hyperparameters for the sparse Gaussian process model on a control unit of a further internal combustion engine; and operating the further internal combustion engine, by the control unit, using the sparse Gaussian process model, the virtual supporting point data points, and the hyperparameters for the sparse Gaussian process model.

5. The non-transitory computer-readable medium as recited in claim 4, wherein the vector $Q_y^*$ for the sparse Gaussian process model is ascertained as $Q_y^* = L_m^{-T} L_m^{-1} + K_{MN}(\Lambda + \sigma_n^2 I)^{-1} Y$, $L_M$ corresponding to the Cholesky decomposition of intermediate variable $Q_M$.

6. The non-transitory computer-readable medium as recited in claim 4, wherein a jitter is applied to the hyperparameter vector $Q_M$ for the sparse Gaussian process model.

* * * * *